Figure 1:
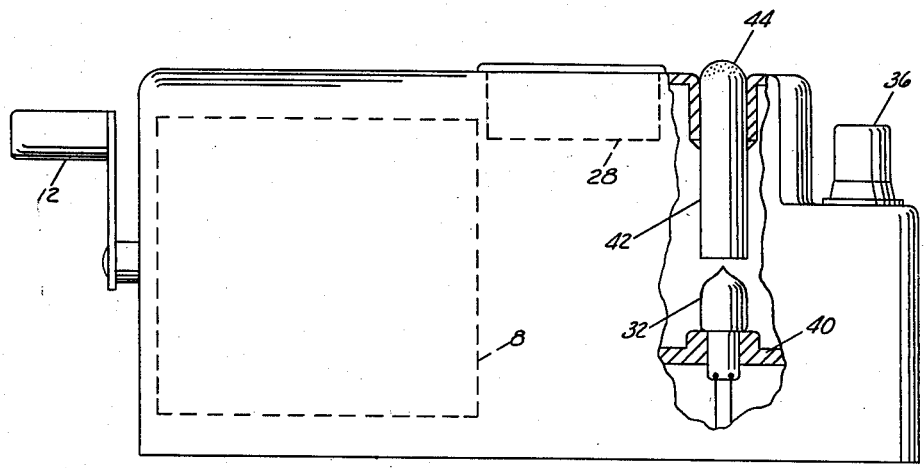

INVENTOR.
VERNON DURBIN
ERNEST W. JOHNSON
BY
Martin J. Finnegan
ATTORNEY

Patented Dec. 23, 1952

2,623,098

UNITED STATES PATENT OFFICE 2,623,098

MEASURING INSTRUMENT

Vernon Durbin, Waban, and Ernest W. Johnson, Everett, Mass., assignors to National Pneumatic Co. Inc., Boston, Mass., a corporation of Delaware Application November 30, 1948, Serial No. 62,622

5 Claims. (Cl. 175—183)

The present invention relates to measuring instruments and more specifically to instruments for the measurement of electrical resistance, particularly where high resistances of the order of one megohm or greater are involved, as in testing insulation.

Direct reading instruments for the measurement of resistances, while particularly convenient for portable use and in applications where a number of readings must be taken rapidly, are subject to the disadvantage that a source of potential must be provided which is substantially constant and of known value. In the case of instruments for the measurement of resistances above one million ohms, the potential available must be of the order of several hundred volts if the indicating instrument is to make use of a conventional meter movement, such as is common in milliammeters.

To supply the required high potential for a conveniently portable high resistance meter or megohm-meter, small hand-cranked generators of the rotating field type have been devised. When used in conjunction with a suitable rectifier and simple filter, a relatively pure D. C. output may be obtained. The reading obtained, however, varies with the speed at which the generator is cranked by the operator while a reading is being taken.

To avoid the necessity of cranking the generator at some predetermined uniform speed in order to obtain a known and constant voltage for use in carrying out the resistance measurement, the present invention has as an object the provision in a compact, portable megohm-meter employing a hand cranked generator, of means for stabilizing the resistance reading when the generator is cranked at a rate in excess of a minimum rate and for indicating automatically to the operator when the cranking is proceeding at a rate which results in stabilizing the reading.

In carrying out the invention, use is made of the regulating effect of a lighted neon lamp or similar type of glow-discharge device, whereby a substantially constant potential drop across the meter is obtained over a relatively wide range of generated voltages. In the preferred construction, several such lamps are connected in series. It is only necesary that the voltage of the source be maintained above the minimum value which is required to keep the lamps ignited.

To take full advantage of this feature, the invention contemplates that the megohm-meter be so constructed and arranged that the condition of the neon lamps will be visible to the operator in order to indicate whether the apparatus is being actuated properly for securing accurate readings. By maintaining the cranking speed at a rate which causes the lamps to glow, the operator is assured that the cranking speed is sufficient to maintain the neon lamps in control of the voltage across the meter terminals and thus permit accurate measurements of resistance to be made.

Figure 2:
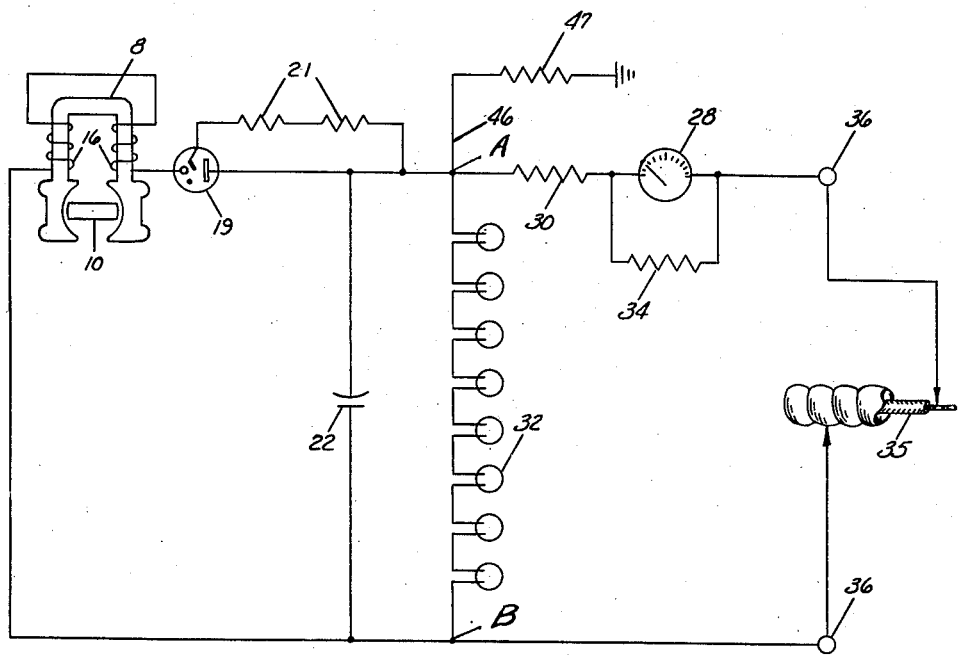

In the drawings illustrating the invention, Figure 1 is a view in side elevation, partly broken away, showing a self-contained resistance measuring and insulation testing instrument embodying the invention, and Figure 2 is a wiring diagram of the instrument, illustrating the various components thereof in conventional schematic fashion.

The high potential necessary for direct-reading measurement of resistances of one megohm or higher is provided by a small hand-cranked generator 8 having a rotating permanent magnet field 10. Speed multiplying connections of standard arrangement permit the rotor to be turned at high speed by operating the small crank 12 provided for the purpose. The generator is provided with a single continuous winding (in two sections as shown) from which may be derived an alternating current voltage of sufficient intensity for the operation to be described.

The output of the generator is converted to direct current by means of a rectifier 19, which may be of the cold cathode type having a main anode and cathode and an auxiliary or starting anode in circuit with suitable high resistance units 21 so that this auxiliary or starting circuit will function as a means of initiating the cycle of operation, after which the rectifying action will proceed by way of the main anode cathode circuit independently of the high resistance shunt circuit 21. The pulsating rectified D. C. is smoothed by a simple capacitant filter 22 which requires no limiting resistance unit when used in conjunction with a rectifier of the type just described.

In order that a substantially constant known voltage may be applied to the actual resistance measuring circuit composed of the unknown resistance, the indicating meter 28, and a fixed resistance 30, means are provided for maintaining a substantial potential drop between points A and B of the circuit as long as the generator is cranked above a certain minimum rate. The means employed to obtain an adequate potential drop consist of a plurality of neon lamps 32 or similar type of glow-discharge device connected in series between points A and B, and hence across the output of the generator and filter.

The glow discharge lamp has the property of lighting, and thereby passing current, when the applied potential exceeds a potential known as the striking potential. Provided that the D. C. potential exceeds the striking potential, the lamp will remain lighted, but if the potential applied drops much below the striking potential, the lamp will extinguish itself. As long as the lamp remains lighted, the potential drop across the terminals remains adequate for stabilization of the reading on meter 28 regardless of variations in the supply voltage. In the type of device found most useful as a portable testing unit, the preferred voltage between A and B is in the neighborhood of 500 volts. This voltage is most conveniently obtained by the use of eight lamps in series, each having a potential drop of approximately 70 volts.

It should be noted that this potential (500) volts is not that impressed across the unknown resistance, but to the measuring circuit composed of the meter 28 with its calibrated shunt 34, the unknown resistance (connected across the meter terminals 36) and the fixed resistance 30 which functions as a protective resistor to limit the meter to full scale deflection (indicating zero resistance) in case the external or insulation resistance under test proves to be a short circuit. Because of the drop across the meter and across the fixed resistor, the potential applied across the unknown resistance will be less than the drop between A and B. However, with a suitable designed instrument, even in the case of insulation or other resistance under test having a resistance as low as one megohm, the potential applied across the same will be in excess of three hundred volts.

As has already been pointed out, the condition of stabilization of the resistance measuring circuit is contingent upon cranking the generator at sufficient speed to maintain the lamps lighted. In order that the operator may be assisted in maintaining the cranking speed at a rate which is at least equal to the minimum speed which will maintain the condition of adequate potential drop across the lamps, means are provided to enable the operator to observe the condition of the lamps while cranking. As long as the lamps are lighted, the operator is assured that the cranking speed is adequate and that resistance measurements may be made with accuracy.

In the embodiment illustrated in Figure 1, the several neon-type glow discharge lamps are arranged in closely spaced relation on a mounting strip 40 extending transversely of the instrument case. In order that their condition of illumination may be observable from outside the case and over a wide range of angles, light transmitting means in the form of rods 42 of a transparent plastic material having a high index of refraction, for example a material such as that commonly identified as "Lucite," are mounted in alignment with one or more of the lamps. The outer ends of these rods are rounded so as to project slightly above the surface of the case, and said rounded surfaces 44 are "frosted" or ground to have a matte surface. As a result, these frosted ends are caused to glow when the lamps within the case are lighted, and the glow may be observed from all directions in which the rod end is visible. Due to the series connection of the neon lamps, it is necessary to observe the condition of but one lamp to determine whether the lamps are in control of potential, since any one lamp can become lighted only by the establishment of current flow and consequent lighting of all the other lamps in the chain. For the convenience of the operator, however, more than one rod may be used if desired, for example a rod may be used at each end of the lamp bank to provide indications at spaced points on the outside of the case.

The present invention thus makes possible a compact resistance measuring and insulation testing instrument wherein the hand-cranked source of potential is automatically stabilized to permit accurate measurements as long as the generator is cranked above a certain critical speed, a continuous check on the cranking speed being proved by observing the condition of light-transmitting means in optical communication with the voltage-stabilizing neon lamps within the case. As long as the neon lamps are lighted, as shown by observation of the indicating means, the cranking speed is satisfactory for taking resistance measurements or testing insulation.

It occasionally happens that there is sufficient condensation to form a leakage path—of high resistance, of course—between the terminals 36, 36 and the instrument housing. Such a leakage path, even though of high resistance, would interfere with the accuracy of the meter reading. To compensate for this there is provided a guard circuit 46 including a grounded high resistance 47, to serve as a shunt path around the meter on such occasions, and thus reduce any error due to such leakage paths.

The insulation under tests, as indicated at 35 in Fig. 2, is merely illustrative of the manner of utilizing the invention. The same principles disclosed may obviously be applied to the measurement of resistances other than wire insulation—for example, the resistance between two conductors, or between a conductor and any other metallic part.

This application contains subject matter originally presented in our application Ser. No. 518,728, filed January 18, 1944, and subsequently abandoned.

What we claim is:

1. In indicating apparatus, a circuit including a test section whose resistance is to be measured, a manually rotatable current generator, a meter including a scale on which the resistance of said test section is directly readable, a lamp circuit adjacent said meter, said lamp circuit being connected directly across the terminals of said generator and therefore subject to generator potential, said lamp circuit including gaseous type glow discharge lamps one of which serves as a check lamp, means for illuminating said check lamp and thereby indicating that the meter operation has become stabilized, and means including all other lamps of said lamp circuit for delaying operation of said illuminating means until said generator reaches a pre-determined speed.

2. Apparatus as defined in claim 1, wherein said delaying means further includes an electronic device having a pair of electrodes across which generated current flows as soon as the generator begins to rotate, and a third electrode to which the generated current is diverted in response to such initial flow.

3. Apparatus as defined in claim 2, wherein said generator includes a pair of field windings in series with said electronic device, and with each other.

4. Apparatus as defined in claim 2, including a guard circuit in shunt with said meter, to compensate for current leakage around said test section.

5. Apparatus as defined in claim 2, wherein said generator windings inherently provide sufficient resistance for control of the rectifying action of said electronic device.

VERNON DURBIN.
ERNEST W. JOHNSON.

REFERENCES CITED

The following references are of record in the file of this patent:

UNITED STATES PATENTS

| Number | Name | Date |
|---|---|---|
| 858,335 | Evershed | June 25, 1907 |
| 1,681,367 | Rolfe | Aug. 21, 1928 |
| 1,918,834 | Crago | July 18, 1933 |
| 2,260,234 | Rolfe | Oct. 21, 1941 |
| 2,272,239 | Delmhorst | Feb. 10, 1942 |
| 2,326,313 | Trucksess | Aug. 10, 1943 |
| 2,429,764 | Moore | Oct. 28, 1947 |
| 2,460,095 | Love | Jan. 25, 1949 |